(12) United States Patent
McWilliams

(10) Patent No.: US 7,057,139 B2
(45) Date of Patent: Jun. 6, 2006

(54) ELECTRIC HEATING ASSEMBLY

(75) Inventor: Kevin Ronald McWilliams, Stratford upon Avon (GB)

(73) Assignee: Ceramaspeed Limited (GB)

( * ) Notice: Subject to any disclaimer, the term of this patent is extended or adjusted under 35 U.S.C. 154(b) by 0 days.

(21) Appl. No.: 10/835,491

(22) Filed: Apr. 29, 2004

(65) Prior Publication Data

US 2004/0245239 A1 Dec. 9, 2004

(30) Foreign Application Priority Data

May 3, 2003 (GB) .................................. 0310285.2

(51) Int. Cl.
*H05B 3/68* (2006.01)
(52) U.S. Cl. .................. 219/467.1; 219/460.1
(58) Field of Classification Search ............ 219/451.1, 219/452.11, 452.12, 460.1, 461.1, 462.1, 219/464.1, 465.1, 467.1, 544, 547, 548
See application file for complete search history.

(56) References Cited

U.S. PATENT DOCUMENTS

| | | | |
|---|---|---|---|
| 3,674,983 A | 7/1972 | Hurko et al. | |
| 3,869,596 A | 3/1975 | Howie | |
| 4,447,710 A * | 5/1984 | McWilliams | 219/448.14 |
| 4,910,388 A | 3/1990 | Lorenz et al. | |
| 5,026,971 A * | 6/1991 | Payne et al. | 219/483 |
| 5,155,338 A * | 10/1992 | Hoffmann | 219/445.1 |
| 5,204,510 A * | 4/1993 | McWilliams et al. | 219/461.1 |
| 5,717,189 A * | 2/1998 | Goetz et al. | 219/483 |
| 5,841,109 A * | 11/1998 | White et al. | 219/452.12 |
| 5,990,457 A | 11/1999 | Steiner et al. | |
| 6,037,572 A | 3/2000 | Coates et al. | |
| 6,274,848 B1 | 8/2001 | Von Mosshaim | |
| 6,403,930 B1 * | 6/2002 | Deo et al. | 219/460.1 |
| 2003/0164366 A1 | 9/2003 | Baum et al. | |

FOREIGN PATENT DOCUMENTS

| | | |
|---|---|---|
| DE | 3341210 | 5/1985 |
| EP | 0866641 | 9/1998 |
| EP | 0980193 | 2/2000 |
| GB | 2296088 | 6/1996 |
| WO | WO 9909791 | 2/1999 |
| WO | WO02071801 | 9/2002 |

OTHER PUBLICATIONS

European Search Report Jul. 14, 2004.
Search Report Jan. 13, 2004.

* cited by examiner

*Primary Examiner*—Sang Paik
(74) *Attorney, Agent, or Firm*—Ira S. Dorman

(57) ABSTRACT

An electric heating assembly comprises a plate (2) having a front face (4) and a rear face (10), and at least one electric heater unit (8) located at the rear face (10) of the plate (2). The electric heater unit (8) is secured to the rear face (10) of the plate (2) by adhesive (20), the adhesive (20) being adapted to withstand a maximum temperature to which it is subjected during operation of the heating assembly.

15 Claims, 5 Drawing Sheets

ELECTRIC HEATING ASSEMBLY

FIELD OF THE INVENTION

This invention relates to an electric heating assembly, particularly for a cooking appliance such as a cooking hob, in which a plate, such as of glass-ceramic material, has at least one electric heater unit located at a rear face thereof.

DESCRIPTION OF PRIOR ART

Such an electric heating assembly is well known in which one or more electric heater units, comprising a dish-like support containing at least one electric heating element and a temperature-limiting device, is or are located in contact with the rear face of the plate. The one or more heater units has or have hitherto been located in an underlying box-like metal supporting structure and urged into contact with the rear face of the plate by spring components. Such an arrangement is cumbersome and expensive but was considered necessary because of the relatively large mass of the heater units, resulting from the use of a relatively heavy metal dish-like support and also from the provision of differentially-expanding rod-in-tube temperature limiters with their associated switch heads. However, the mass of heater units has tended to be reduced in recent times by the use of lightweight electronic temperature sensing components and also by the reduction in weight of, or the elimination of, the metal dish-like support.

OBJECT OF THE INVENTION

It is an object of the present invention to overcome or minimise this problem.

SUMMARY OF THE INVENTION

According to the present invention there is provided an electric heating assembly comprising a plate having a front face and a rear face, and at least one electric heater unit located at the rear face of the plate, wherein the heater unit is secured to the rear face of the plate by adhesive means, the adhesive means being adapted to withstand a maximum temperature to which it is subjected during operation of the heating assembly.

The plate may comprise glass-ceramic material and may be arranged with the front face adapted for receiving at least one cooking vessel in a cooking appliance.

The or each radiant electric heater unit may comprise a dish-like support having therein at least one electric heating element.

The dish-like support may comprise metal and/or thermal insulation material.

The dish-like support may comprise moulded substantially rigid thermal insulation material, which may be selected from granular insulation material, plate-like insulation material, and microporous thermal insulation material and mixtures thereof.

The dish-like support of the or each electric heater unit may have an upstanding peripheral rim having an upper surface adapted and located in contact with the rear face of the plate. The upper surface of the upstanding peripheral rim may be secured to the rear face of the plate by the adhesive means.

Alternatively, at least one bracket means such as of metal may be provided supporting the at least one electric heater unit, the or each bracket means having a portion thereof, such as a flange, secured to the rear face of the plate by the adhesive means.

The at least one electric heater unit may comprise an integrated plurality of heater sub-units providing multiple heating zones on the plate.

At least one control unit and/or terminal unit may be adhesively secured to the rear face of the plate and electrically connected to the at least one electric heater unit. The at least one control unit and/or terminal unit may be adhesively secured by the same form of adhesive means used to secure the at least one radiant electric heater unit to the rear face of the plate.

At least one temperature-sensing component may be provided associated with the at least one electric heater unit. The at least one temperature-sensing component may comprise an electrical resistance temperature detector, such as a platinum resistance temperature detector, which may comprise a platinum element on a ceramic substrate, and may be supported in the at least one electric heater unit or adhesively secured, such as by the adhesive means, to the rear face of the plate.

The adhesive means may be selected from a high temperature RTV silicone, a high temperature epoxy and a high temperature ceramic adhesive.

The present invention also provides a cooking appliance incorporating the electric heating assembly.

By means of the present invention a heater unit is adhesively secured in contact with the rear surface of a plate, such as a cooking plate, without requirement for an underlying supporting structure and spring-biasing means.

For a better understanding of the present invention and to show more clearly how it may be carried into effect, reference will now be made, by way of example, to the accompanying drawings in which:

DESCRIPTION OF PREFERRED EMBODIMENTS

Figure 1:
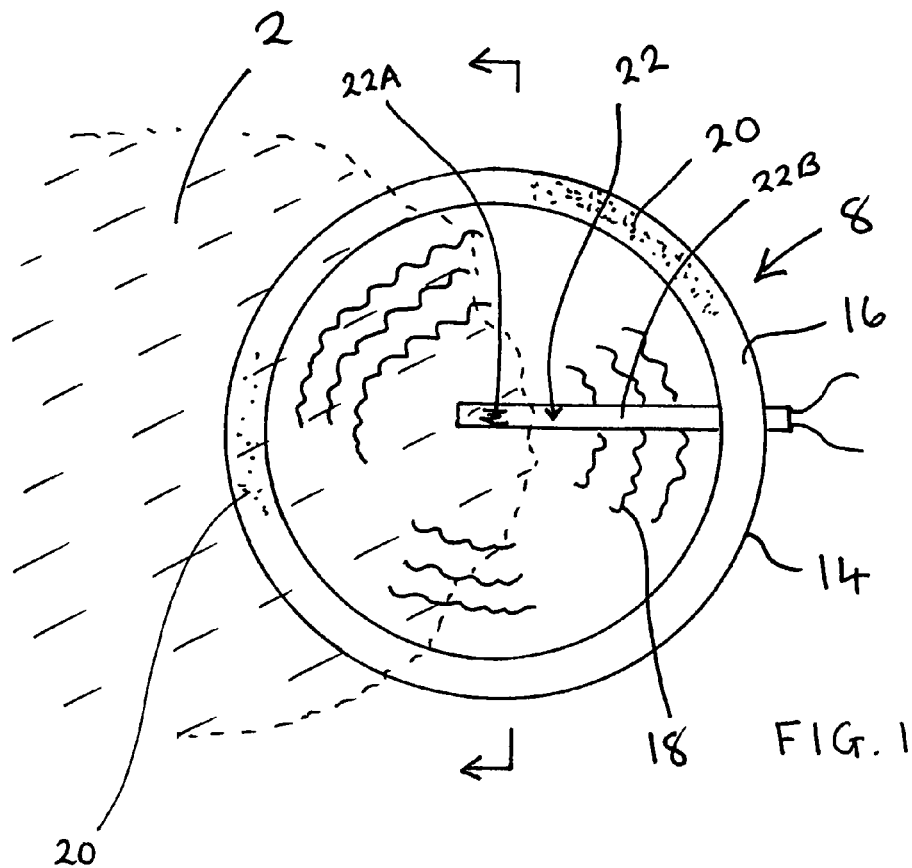
FIG. 1 is a plan view of an embodiment of an electric heating assembly according to the present invention.
Figure 2:
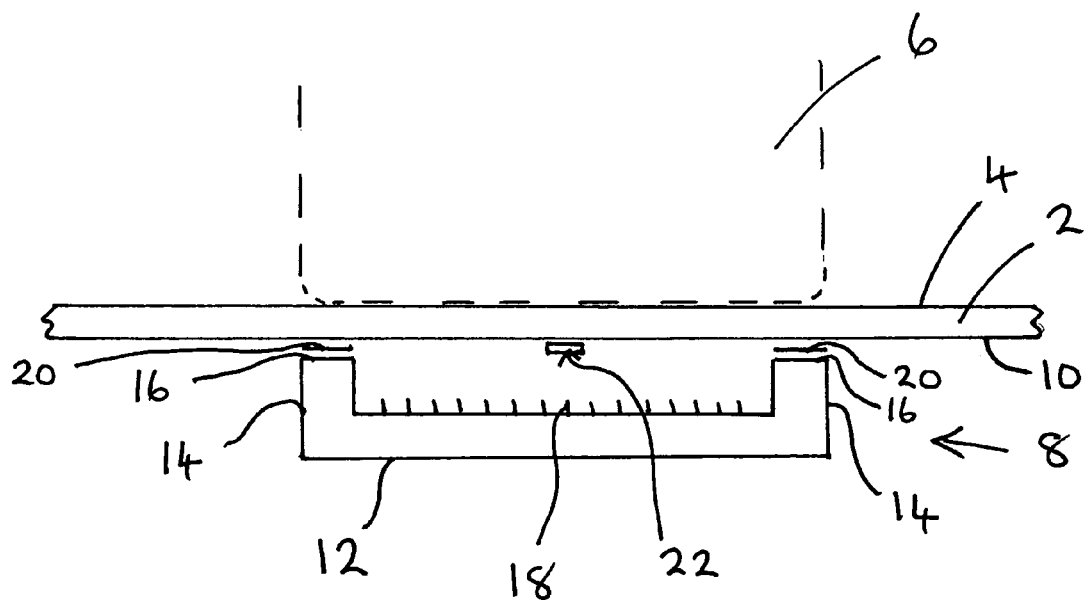
FIG. 2 is a cross-sectional view of the assembly of FIG. 1.

Referring to FIGS. 1 and 2, an electric heating assembly for a cooking appliance comprises a plate 2 of glass-ceramic material arranged with a front face 4 for receiving a cooking vessel 6. A radiant electric heater unit 8 is located at a rear face 10 of the plate 2 and comprises a dish-like support 12 of moulded substantially rigid thermal insulation material, having an upstanding peripheral rim 14 with an upper surface 16. At least one electric heating element 18 of well-known form, such as corrugated metal ribbon form, is located inside the dish-like support 12. The dish-like support 12 may, for example, comprise moulded granular and/or plate-like and/or microporous thermal insulation material, as known to the skilled person.

The heater unit 8 is secured to the rear face 10 of the plate 2 by adhesive means 20 applied to the upper surface 16 of the peripheral rim 14 of the dish-like support 12. The adhesive means 20 is applied to the entire upper surface 16 of the peripheral rim 14 or onto spaced-apart discrete regions thereof and is provided in liquid, paste or strip form. The adhesive means 20 is arranged such as to support the suspended weight of the heater unit 8 and to withstand a maximum temperature to which it is subjected during operation of the heating assembly.

The adhesive means 20 suitably comprises a high temperature RTV silicone, a high temperature epoxy or a high temperature ceramic adhesive such as that sold under the trade mark FORTAFIX.

A temperature-sensing component 22 is provided in the heater unit 8, overlying the heating element 18. Such temperature-sensing component 22 suitably comprises a resistance temperature detector, such as a platinum resistance temperature detector, which may comprise a platinum element 22A on a ceramic substrate 22B, and is arranged to be connected to appropriate external processing circuitry (not shown) of known form. The temperature-sensing component 22 may be suspended across the heater unit 8 or may be adhesively secured to the rear surface 10 of the plate 2 by adhesive means, which may be substantially the same as the adhesive means 20.

Figure 3:
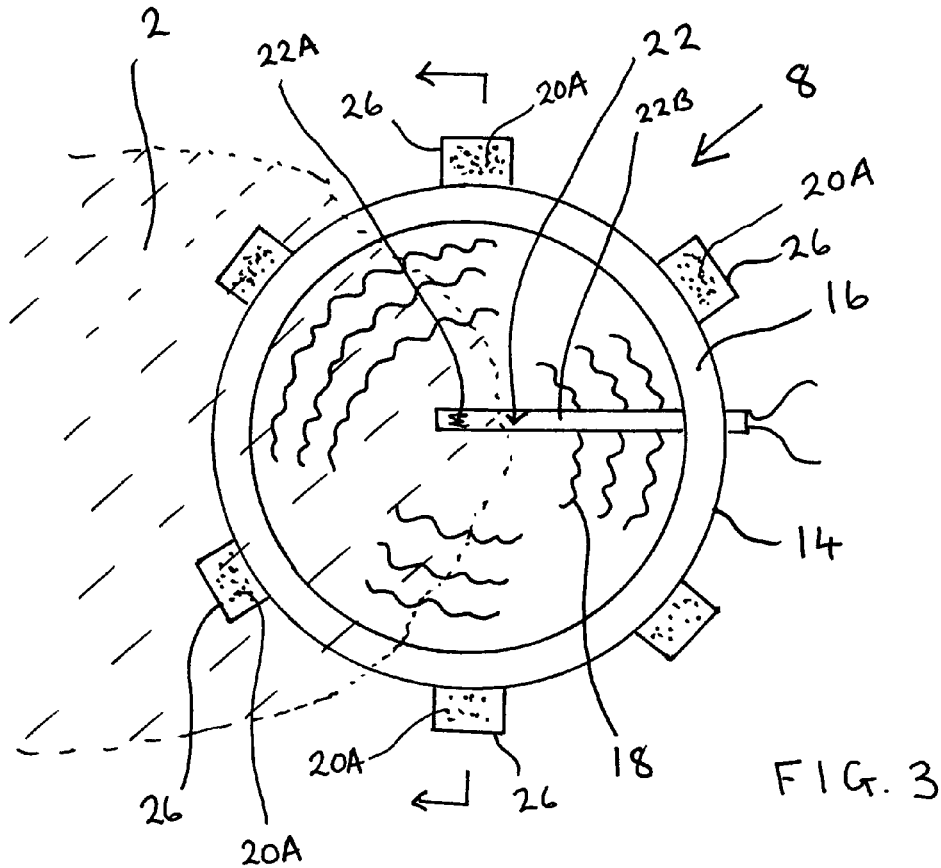
FIG. 3 is a plan view of a further embodiment of an electric heating assembly according to the present invention.
Figure 4:
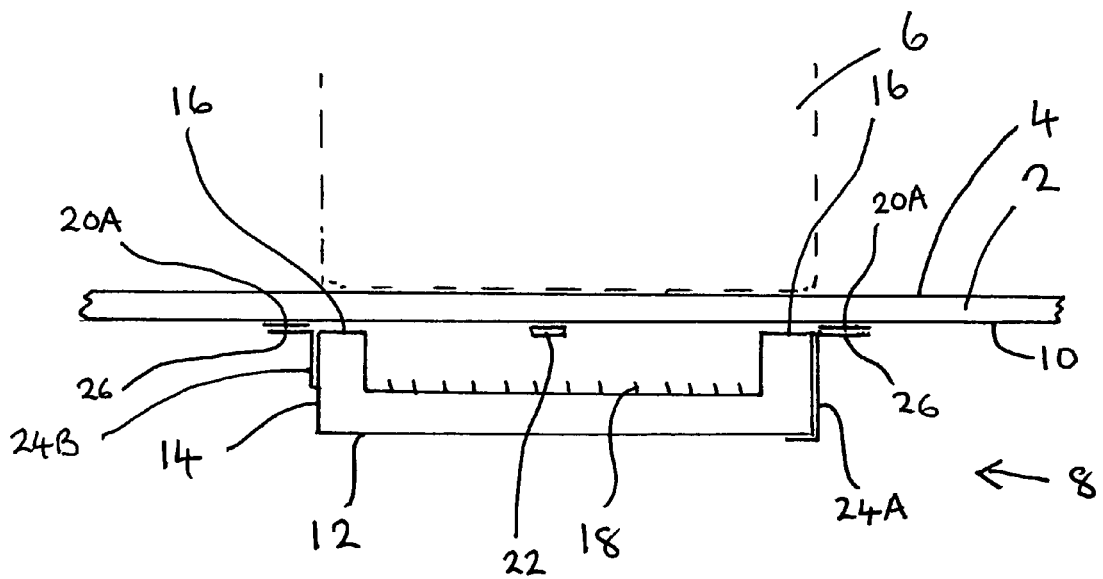
FIG. 4 is a cross-sectional view of the assembly of FIG. 3.

An alternative arrangement of electric heating assembly according to the present invention is shown in FIGS. 3 and 4. This alternative arrangement is similar to that described with reference to FIGS. 1 and 2 except that, instead of the heater unit 8 being secured to the rear surface 10 of the plate 2 by the adhesive means 20 applied to the upper surface 16 of the peripheral rim 14 of the dish-like support 12, metal brackets of alternative forms shown by reference numerals 24A and 24B are provided. Metal brackets 24A are shaped to underlie and support the dish-like support 12 of the heater unit 8 and metal brackets 24B are secured to the peripheral rim 14 of the dish-like support 12. The brackets 24A or 24B have a flanged upper portion 26 which is secured to the rear face 10 of the plate 2 by adhesive means 20A which is substantially the same as the adhesive means 20 of FIGS. 1 and 2. The heater unit 8 is secured by the brackets 24A or 24B to the rear face 10 of the plate 2 with the upper surface 16 of the rim 14 of the dish-like support 12 in contact with the rear face 10 of the plate 2.

Instead of providing a plurality of brackets 24A or 24B, a single band-form supporting bracket means could be provided, encircling and secured to or supporting the dish-like support 12 and having a flanged upper portion adhesively secured to the rear face 10 of the plate 2.

Instead of the dish-like support 12 being provided of thermal insulation material, it could comprise metal and contain a layer of thermal insulation material. In this case, the peripheral rim 14 of the dish-like support 12 would also comprise metal and could be provided with one or more flanges, similar to the flanges 26 of the brackets 24A and 24B, for securing the heater unit 8 to the rear face 10 of the plate 2 by the adhesive means 20A. Such flange or flanges could be integral with the metal dish-like support 12 or could be provided on additional brackets similar to brackets 24A and 24B.

Figure 5:
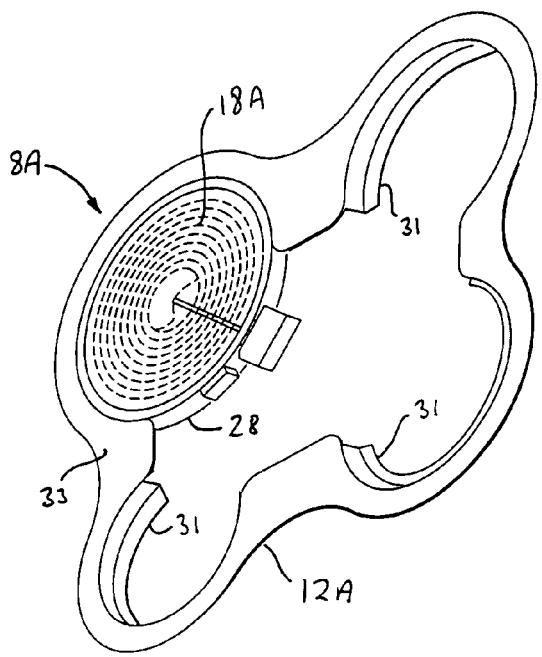
FIG. 5 is a perspective view of a still further embodiment of part of an electric heating assembly according to the present invention.

Referring now to FIG. 5, this shows part of an electric heating assembly in which a heater unit 8A comprises an integrated plurality of heater sub-units 28 (only one shown for clarity) located on a support 12A such as comprising a pressed sheet of metal provided with part-annular flanges for supporting each of the heater sub-units 28. The individual heater sub-units 28 are constructed in similar manner to the heater unit 8 of FIGS. 1 and 2, each having one or more heating elements 18A, and each heater sub-unit 28 is supported by a part-annular recessed flange 31 provided in the support 12A. The support 12A has a peripheral rim 33 whose upper surface is secured to the rear face of the plate (not shown) 2 by adhesive means 20B as previously described.

The heater sub-units 28 are electrically connected by wiring to a terminal block, which is suitably secured to the rear face of the plate by adhesive means substantially the same as the adhesive means 20B.

Figure 6:
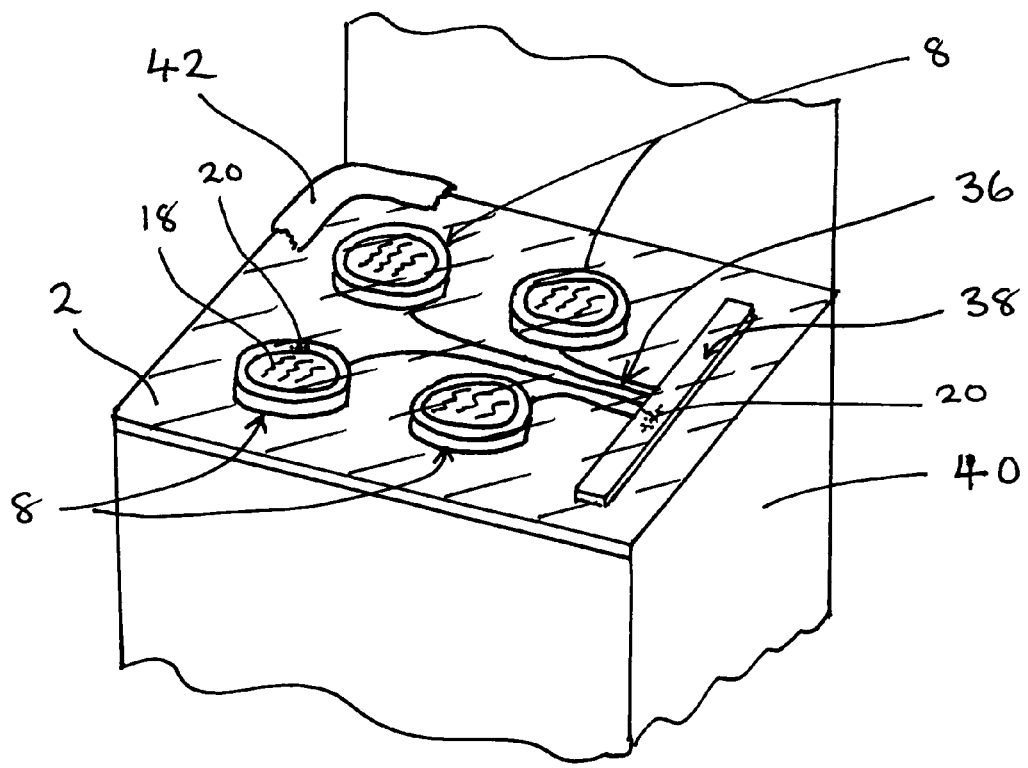
FIG. 6 is a perspective view of an embodiment of an electric heating assembly according to the present invention incorporating a control and/or terminal unit.

Referring now to FIG. 6, this shows an electric heating assembly in which a plurality of electric heater units 8, each as shown in and described with reference to FIG. 1 or 3, are secured by the adhesive means 20 to the rear surface of a glass-ceramic cooking plate 2. The heater units 8 are electrically connected by wiring 36 to a control and/or terminal unit 38, which is also secured to the rear face of the plate 2 by the same form of adhesive means 20. The resulting heating assembly is readily installed as a pre-wired hob unit into a cooking appliance 40 and is suitably located by means of a frame 42.

Figure 7:
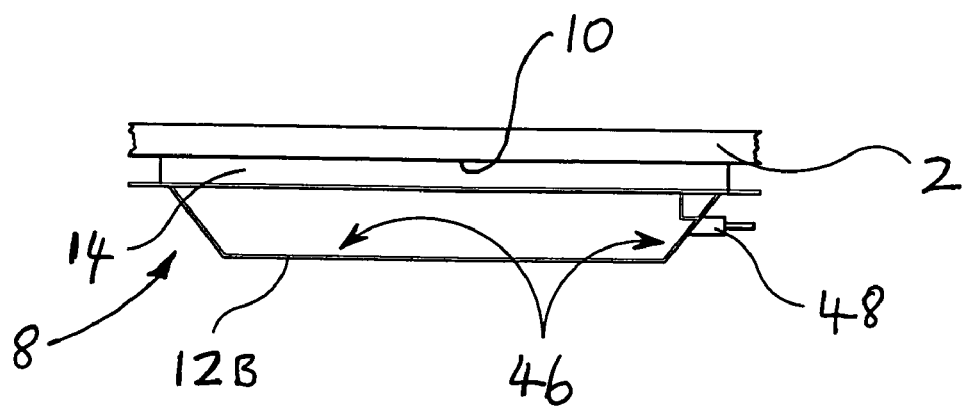
FIG. 7 is a cross-sectional view of another embodiment of an electric heating assembly according to the present invention.
Figure 8:
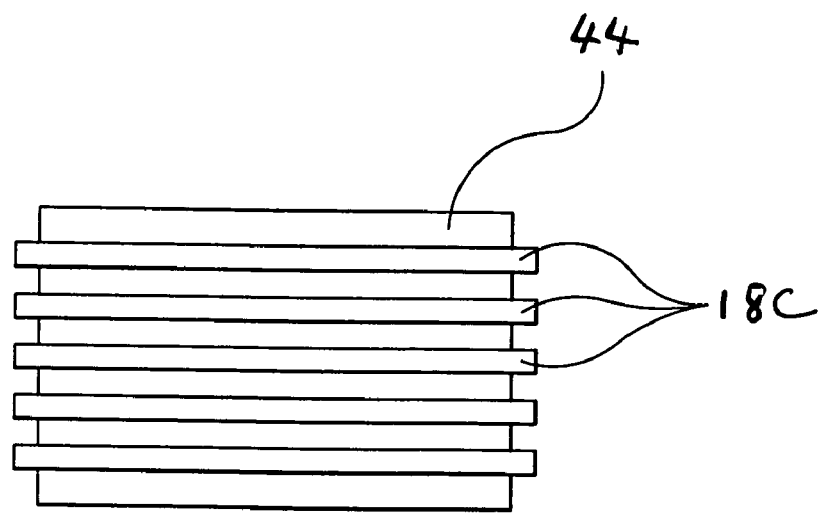
FIG. 8 is a plan view of a heating element wound around a dielectric layer forming part of the electric heating assembly shown in FIG. 7.

Referring to FIGS. 7 and 8, an electric heating assembly for a cooking appliance comprises a heater unit 8 in the form of an elongate electrical resistance heating element 18C wound around a sheet-like layer of dielectric material 44. The dielectric layer 44, and heating element 18C thereon, is maintained in direct contact with the rear face 10 of an electrically insulating warming surface in the form of a glass-ceramic plate 2 of infrared transmissive material by means of a dish-like support 12B which is formed with an upstanding peripheral rim 14 having an upper surface 16.

The elongate electrical resistance element 18C is of a form which facilitates winding around the layer of dielectric material 44, for example wire or ribbon form. This construction enables a heater arrangement to be manufactured quickly and cost effectively. When in the form of a ribbon, the plane of the ribbon 18C is parallel to the plane of the dielectric material 44.

The sheet-like layer of dielectric material 44, for example mica, provides a relatively rigid electrically non-conductive base for the wound heating element 18C and insulates the dish-like support 12B from the element 18C when the dish-like support 12B holds the dielectric material in firm contact against the undersurface of the glass-ceramic plate 2.

Contact between the heating element 18C and the rear face 10 of the glass-ceramic plate 2 is maintained by securing the dish-like support 12B in position relative to the rear face 10 of the glass-ceramic plate 2 with adhesive means 20 as described hereinbefore.

The surface finish of the inner surface 46 of the base and sides of the dish-like support 12B is highly reflective to act as a directional heat reflector. The presence of the reflective surface 46 reduces the heat lost by radiation from the apparatus through the support 12B and increases the heat transmitted to the glass-ceramic plate 2.

An end region of the heating element 18C extends through an aperture in the dish-like support 12B and a terminal 48 is provided for connecting the heating element 18C to a power supply (not shown).

As described hereinabove, to create a warming zone for a glass-ceramic cooking appliance, only a relatively low power loading, less than 0.5 watts per square centimeter, is required to achieve acceptable glass-ceramic surface temperatures. Consequently, only a low wattage is generated by the assembly of the heating element 18C around the dielectric layer 44. It is therefore safe for the heating element 18C to be placed in direct contact with the undersurface of the glass-ceramic plate 2, as the temperature of the glass-ceramic material in use will be low, maintaining the high electrical resistivity of the glass-ceramic material.

Figure 9:
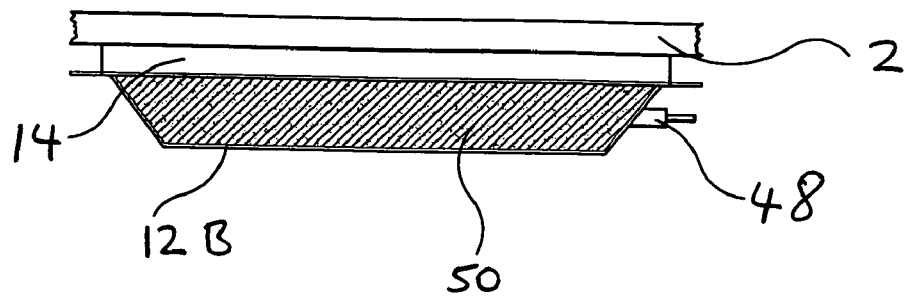
FIG. 9 is a cross-sectional view of a further embodiment of an electric heating assembly according to the present invention incorporating a thermal insulation layer.

FIG. 9 shows a further embodiment of an electric heating assembly comprising an elongate electrical resistance heating element 18C wound around a sheet-like layer of dielectric material 44. The dielectric layer 44, and heating element 18C thereon, is maintained in direct contact with the rear face 10 of glass-ceramic plate 2 by means of dish-like support 12B. The dish-like support 12B contains a layer of thermal insulation material 50, such as moulded granular and/or plate-like and/or microporous thermal insulation material, as known to the skilled person.

Figure 10:
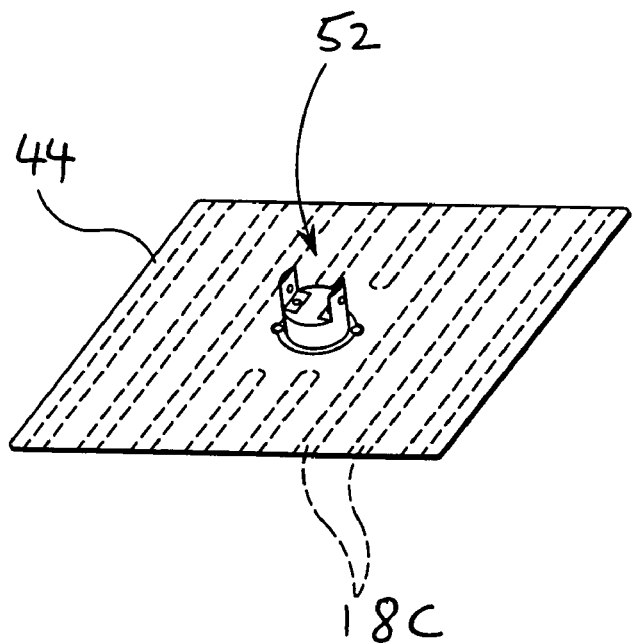
FIG. 10 is a perspective view of the underside of a modification of the element and dielectric layer arrangement of FIG. 8 showing the presence of a thermostat.
Figure 11:
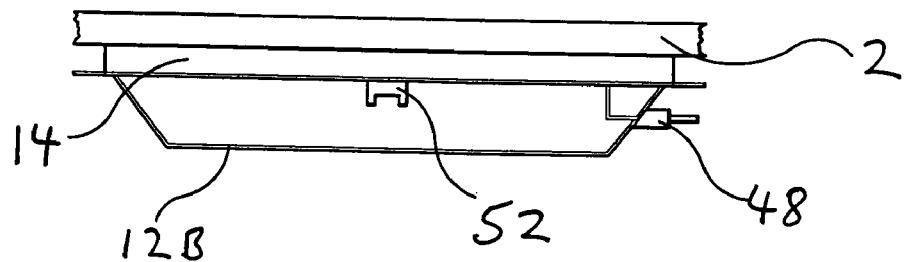
FIG. 11 is a cross-sectional view of an electric heating assembly according to the present invention showing the position of the thermostat in relation to a food warming surface of the apparatus.

Referring to FIGS. 10 and 11, an electric heating assembly is shown with a disc-type thermostat 52 attached to the underside of the sheet-like layer of dielectric material 44, between adjacent turns of the heating element 18C.

The disc-type thermostat 52 is positioned in order that it can sense the temperature of the glass-ceramic plate 2. The temperature sensed by the thermostat 52 can be used to activate a warning light (not shown) to inform a user when the glass-ceramic plate 2 is considered too hot to be touched.

Although FIG. 11 shows the disc-type thermostat 52 in relation to the dish-like support 12B, without the presence of thermal insulation 50, it should be appreciated that it could also be used in an electric heating assembly as shown in FIG. 9 which utilises thermal insulation 50.

I claim:

1. An electric heating assembly comprising a plate having a front face and a rear face, and at least one electric heater unit located at the rear face of the plate, wherein the heater unit comprises a dish-like support having therein at least one electric heating element, the dish-like support including an upstanding peripheral wall of thermal insulation material located in contact with the rear face of the plate, the upper surface of the upstanding peripheral wall being secured to the rear face of the plate by adhesive means located between the upper surface of the peripheral wall and the rear face of the plate, the adhesive means being adapted to withstand a maximum temperature to which it is subjected during operation of the heating assembly.

2. An assembly as claimed in claim 1, wherein the plate comprises glass-ceramic material.

3. An assembly as claimed in claim 1, wherein the plate is 15 arranged with the front face adapted for receiving at least one cooking vessel in a cooking appliance.

4. An assembly as claimed in claim 1, wherein the thermal insulation material comprises moulded substantially rigid thermal insulation material.

5. An assembly as claimed in claim 4, wherein the thermal insulation material is selected from granular insulation material, plate-like insulation material, and microporous thermal insulation material and mixtures thereof.

6. An assembly as claimed in claim 1, wherein at least one unit selected from a control unit and a terminal unit is adhesively secured to the rear face of the plate and electrically connected to the at least one electric heater unit.

7. An assembly as claimed in claim 6, wherein the at least one unit is adhesively secured by the same form of adhesive means used to secure the at least one electric heater unit to the rear face of the plate.

8. An assembly as claimed in claim 1, wherein at least one temperature-sensing component is provided associated with the at least one electric heater unit.

9. An assembly as claimed in claim 8, wherein the at least one temperature-sensing component comprises an electrical resistance temperature detector.

10. An assembly as claimed in claim 9, wherein the electrical resistance temperature detector comprises a platinum resistance temperature detector.

11. An assembly as claimed in claim 10, wherein the platinum resistance temperature detector comprises a platinum element on a ceramic substrate.

12. An assembly as claimed in claim 8, wherein the at least one temperature-sensing component is supported in the at least one electric heater unit.

13. An assembly as claimed in claim 8, wherein the at least one temperature-sensing component is adhesively secured to the rear face of the plate.

14. An assembly as claimed in claim 13, wherein the at least one temperature-sensing component is secured to the rear face of the plate by the adhesive means.

15. An assembly as claimed in claim 1, wherein the adhesive means is selected from high temperature RTV silicone, a high temperature epoxy and a high temperature ceramic adhesive.

* * * * *